Feb. 15, 1955  J. A. WILLIAMSON  2,702,143
COVER FOR COOKING UTENSILS
Filed Sept. 22, 1951
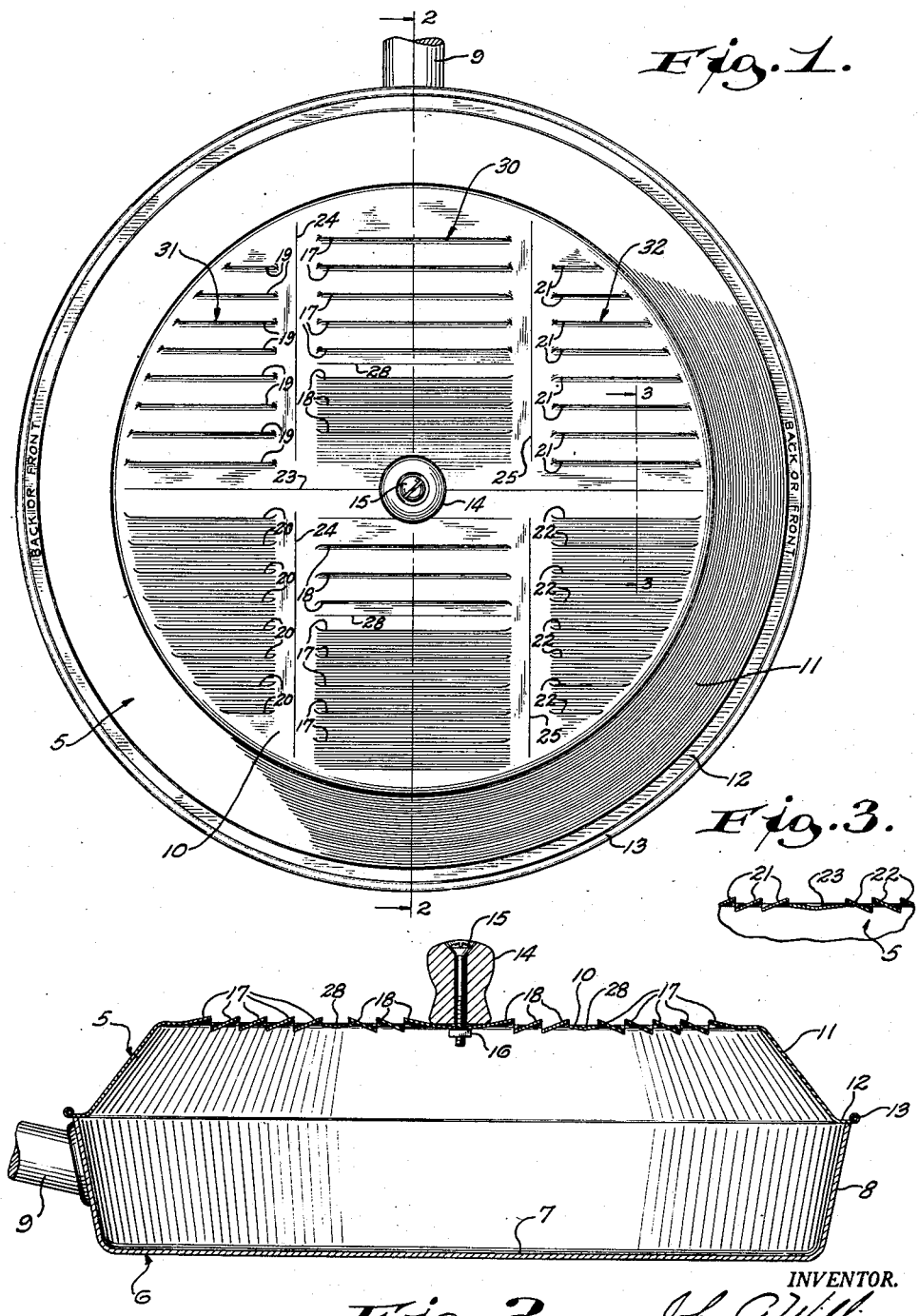
INVENTOR.
John A. Williamson
BY
Morsell & Morsell
ATTORNEYS.

United States Patent Office 2,702,143
Patented Feb. 15, 1955

2,702,143

COVER FOR COOKING UTENSILS

John A. Williamson, Milwaukee, Wis.

Application September 22, 1951, Serial No. 247,887

1 Claim. (Cl. 220—44)

This invention relates to improvements in covers for cooking utensils.

During certain cooking operations, such as during frying, roasting, browning, or the like, it is necessary that steam and cooking vapors be permitted to escape freely. The above mentioned cooking operations are frequently accompanied by a spattering of grease and by the giving off of volatile liquids. The spattering of grease not only subjects the user to the likelihood of injury from burns, but it also frequently results in the deposit of grease on the stove, floor, adjacent walls or on other nearby objects. In addition, the volatile liquids given off during these cooking operations are likely to become ignited by the flame of the stove burner.

With the above in mind, it is a general object of the invention to provide a utensil cover which is formed with a novel arrangement of louvers and which is adapted for use during frying operations or the like to prevent spattering from the utensil.

A further object of the invention is to provide a louvered utensil cover of the class described wherein the louvers adjacent the cover handle are arranged to prevent injury to the hand from spattering in the area immediately adjacent the handle.

A further object of the invention is to provide a louvered utensil cover of the class described which is constructed in a manner to reduce the possibility of grease vapors and volatile liquids becoming ignited by an adjacent burner flame.

A further, more specific object of the invention is to provide a louvered utensil cover of the class described wherein the louvers in the central area thereof open away from a centrally disposed handle, and wherein the louvers in the outer areas thereof open away from the periphery of said cover.

A further object of the invention is to provide a louvered utensil cover of the class described wherein the louvers are arranged in a manner so that maximum protection is afforded for the user when the cover is disposed in either of two positions relative to the user.

A further object of the invention is to provide a louvered utensil cover of the class described which is sanitary and which is easily cleaned.

A further object of the invention is to provide a louvered utensil cover which is simple in construction, inexpensive to manufacture, and which is otherwise well adapted for the purposes described.

With the above and other objects in view, the invention consists of the improved utensil cover, and all of its parts and combinations, as set forth in the claims, and all equivalents thereof.

In the drawing accompanying and forming a part of this specification, wherein is shown one complete embodiment of the preferred form of the invention, and wherein like characters of reference indicate the same parts in all of the views:

Fig. 1 is a fragmentary plan view of the improved cover positioned on a frying pan, the handle of said frying pan being broken away;

Fig. 2 is a vertical sectional view taken along the line 2—2 of Fig. 1; and

Fig. 3 is a fragmentary sectional view taken on line 3—3 of Fig. 1.

Referring more particularly to the drawing, the numeral 5 indicates the improved utensil cover, and the numeral 6 indicates a frying pan on which said cover is positioned. The frying pan 6 may be of conventional proportions, having a circular bottom wall 7 and an inverted frusto-conical side wall 8. A handle 9 projects from the side wall 8, as shown.

The improved cover may have the general shape of a conventional inverted pie plate, though it may take a variety of other shapes within the concept of the invention. In the embodiment shown the cover 5 has a circular generally flat main portion or upper wall 10 from the periphery of which projects a downwardly and outwardly directed frusto-conical wall 11. The wall 11 is formed at its outer edge with a peripheral flange 12 which may be formed with a peripheral bead 13. A handle 14 may be affixed to the central portion of the upper wall 10 by any suitable means such as a screw 15 and a nut 16.

The main portion 10 of the cover 5 is formed with a plurality of alined, spaced, parallel louvers 17 and 18, disposed in a row 30 extending diametrically thereof. The louvers 17 and 18 extend transversely of the row 30 of which they form a part. The louvers 17 are positioned relatively close to the periphery of the main portion 10 and at opposite ends of the row 30, and they are bent to direct any discharge which might escape therethrough in a direction away from the outer periphery. The louvers 18 are disposed in two groups on opposite sides of the handle 14 as shown, and are parallel with the louvers 17. The louvers 18 are bent to direct any discharge away from the handle 14 and toward the periphery of the cover 5, as shown.

Referring to Fig. 1, the portion 10 of the cover is formed with a plurality of spaced, parallel louvers 19 and 20 which are positioned in a row 31, the latter being parallel with and spaced to the left of the central diametric row of louvers 30, as viewed in Fig. 1. The row 31 is adjacent the periphery of the portion 10 and the louvers 19 and 20 vary in length to conform to the circular shape. The louvers 19 are on one side of the handle 14 as viewed in Fig. 1 and the louvers 20 are on the other side of said handle, as viewed in Fig. 1. The louvers 19 and 20 are bent to open in opposite directions toward each other and away from the periphery of the portion 10, in the same manner as is shown in Fig. 3 for the louvers 21 and 22.

A plurality of spaced, parallel louvers 21 and 22 are arranged in a row 32 which is parallel with and spaced to the right of the central diametric row of louvers 30, as viewed in Fig. 1. The row 31 is also adjacent the periphery of the portion 10 and the louvers 21 and 22 vary in length to conform to the circular shape of the periphery. The louvers 21 are positioned on one side of the handle 14, as viewed in Fig. 1, and louvers 22 are positioned on the opposite side. The louvers 21 and 22 are bent to open in opposite directions toward each other and away from the periphery of the portion 10, as shown in Fig. 3.

It will be noted that the portion 10 of the cover 5 has an unlouvered area extending diametrically at right angles to the rows 30, 31 and 32 and parallel with the louvers thereof. This unlouvered area is preferably formed with a diametrically extending elongated indentation 23 for the purposes of rigidity. Similar indentations 24 and 25 are formed between the rows of louvers 30 and 31 and 30 and 32, respectively, as shown. The indentations 24 and 25 are also for the purposes of rigidity. Between the adjacent louvers 17 and 18 the portion 10 is formed with elongated indentations 28 for rigidity.

It will be noted that all of the louvers which are positioned adjacent the periphery of the improved cover open away from the peripheral portion nearest thereto. This prevents any spattering of grease outwardly from the covered utensil and thereby avoids the spattering of grease upon the stove, floor, adjacent walls, or upon the cook. It also avoids the possibility of volatile liquids or grease vapors being directed outwardly from the utensil to a position where they might be ignited by the burner flame.

It will be noted that the louvers 18 open away from the handle 14. This prevents any spattering of hot grease or flow of hot vapors toward said handle, and eliminates the possibility of the hand of the user being burned by said spattering or hot vapors when grasping the handle 14.

It will also be noted that all of the louvers in the embodiment of the invention shown are disposed parallel to one another and that said louvers open in either one of two directions only, i. e., the direction in line with the rows 30, 31 and 32. Referring to Fig. 1 it will be noted that the flange 12 is marked "back or front" at diametrically opposite points, said diameter being parallel with all of the louvers. Since all of the louvers open in a direction at right angles to their length, when the cover 5 is positioned on the utensil 6 in a manner so that one of the notations "back or front" is adjacent the user, there is no possibility of any spattering whatsoever being directed toward the user, regardless of the point within the utensil at which said spattering may originate.

The improved cover permits the free escape of steam and cooking vapors, while avoiding the danger of spattering which normally accompanies open pan frying or the like. The improved cover is simple in construction and is very easily cleaned.

Various other patterns of louvers for the portion 10 of the cover 5 may be employed for directing cooking vapors, heat and spattering grease away from the central handle area, and for directing vapors, heat and grease inwardly away from the periphery, the disclosed embodiment being merely illustrative of the preferred form. Various other changes and modifications may be made without departing from the spirit of the invention, and all of such changes are contemplated as may come within the scope of the claim.

What I claim is:

In a cooking utensil cover having a top portion, a handle at the center of said top portion, said top portion having a diametric row of spaced parallel slits with the slits extending transversely of the row and with the material between slits forming louvers, the louvers of said row which are adjacent the handle being angled to open away from said handle and the louvers of said row which are adjacent the periphery being angled to open in a direction away from said periphery, said top portion having other rows of spaced parallel slits with the slits extending transversely of the rows and with the material between slits forming louvers, said other rows being parallel with said diametric row and the louvers of said other rows extending parallel to the louvers of said diametric row and being angled to open toward the diametric line which is normal to said diametric row.

References Cited in the file of this patent

UNITED STATES PATENTS

| | | |
|---|---|---|
| 534,138 | Cleary | Feb. 12, 1895 |
| 1,470,281 | Mohlman | Oct. 9, 1923 |
| 1,831,654 | Cross | Nov. 10, 1931 |
| 2,227,990 | Zelt | Jan. 7, 1941 |
| 2,348,452 | Christopher | May 9, 1944 |
| 2,506,957 | Gomez | May 9, 1950 |

FOREIGN PATENTS

| | | |
|---|---|---|
| 5,731/27 | Australia | Jan. 28, 1927 |